(12) United States Patent
Douglas et al.

(10) Patent No.: US 7,366,339 B2
(45) Date of Patent: Apr. 29, 2008

(54) SYSTEM AND METHOD FOR DETECTING CHEQUE FRAUD

(75) Inventors: Donald J. Douglas, Scarborough (CA); Marcel Levesque, Scarborough (CA)

(73) Assignee: Electronic Imaging Systems Corporation, Ontario (CA)

( * ) Notice: Subject to any disclaimer, the term of this patent is extended or adjusted under 35 U.S.C. 154(b) by 0 days.

(21) Appl. No.: 11/518,450

(22) Filed: Sep. 11, 2006

(65) Prior Publication Data

US 2007/0064991 A1 Mar. 22, 2007

Related U.S. Application Data

(63) Continuation of application No. 10/309,818, filed on Dec. 5, 2002, now abandoned.

(60) Provisional application No. 60/418,161, filed on Oct. 15, 2002.

(51) Int. Cl.
*G06K 9/00* (2006.01)

(52) U.S. Cl. .................. 382/137; 382/321; 235/379

(58) Field of Classification Search ........ 382/112–113, 382/135–140, 177–179, 182–193, 209, 219, 382/305, 317–321, 115, 168, 231, 232, 290–292; 235/379; 380/51; 347/116; 705/16; 109/24.1
See application file for complete search history.

(56) References Cited

U.S. PATENT DOCUMENTS

| | | | |
|---|---|---|---|
| 4,310,885 A * | 1/1982 | Azcua et al. ............ 705/16 |
| 5,237,159 A | 8/1993 | Stephens et al. | |
| 5,383,685 A | 1/1995 | Lee | |
| 5,411,259 A | 5/1995 | Pearson et al. | |
| 5,432,506 A | 7/1995 | Chapman | |
| 5,532,464 A | 7/1996 | Josephson et al. | |

(Continued)

FOREIGN PATENT DOCUMENTS

CA 2 113 553 2/1993

(Continued)

OTHER PUBLICATIONS

Imagesoft Technologies—Titan , Fiserv Solutions Provider: ImageSoft Technologies, 2002 Fiserv Inc.

(Continued)

*Primary Examiner*—Seyed Azarian
(74) *Attorney, Agent, or Firm*—Bereskin & Parr; Isis E. Caulder (57) ABSTRACT

A system and method for detecting check fraud includes a check scanning module and a detection module. The check scanning module scans checks and matches the encoded Magnetic Ink Character Recognition (MICR) data (i.e. serial number, Customer Account Number and amount) from the scanned digital electronic images with items in an issuance database which contains client provided check particulars. The detection module passes the check images through an optical character recognition (OCR) process to read what is written on the check and to match results against the issuance database. If the written information on the face of a check is unreadable or there is no match with the information in the issuance database, the detection module passes the check through a series of slower more precise OCR processes. Any checks that are not successfully read and matched are highlighted as an "exception" and immediately forwarded to the client for further action.

12 Claims, 7 Drawing Sheets

U.S. PATENT DOCUMENTS

| | | |
|---|---|---|
| 5,689,579 A | 11/1997 | Josephson |
| 5,691,524 A | 11/1997 | Josephson |
| 5,781,654 A * | 7/1998 | Carney ................. 382/137 |
| 5,783,808 A | 7/1998 | Josephson |
| 5,818,021 A | 10/1998 | Szewczykowski |
| 5,819,236 A | 10/1998 | Josephson |
| 5,875,333 A | 2/1999 | Fish et al. |
| 5,890,141 A | 3/1999 | Carney et al. |
| 5,893,078 A | 4/1999 | Paulson |
| 5,896,298 A | 4/1999 | Richter |
| 5,977,967 A | 11/1999 | Berner et al. |
| 6,019,282 A | 2/2000 | Thompson et al. |
| 6,039,249 A | 3/2000 | Szewczykowski |
| 6,073,121 A | 6/2000 | Ramzy |
| 6,166,749 A * | 12/2000 | Lee ..................... 347/116 |
| 6,181,814 B1 * | 1/2001 | Carney ................. 382/137 |
| 6,233,340 B1 | 5/2001 | Sandru |
| 6,301,379 B1 | 10/2001 | Thompson et al. |
| 6,574,377 B1 * | 6/2003 | Cahill et al. ............ 382/305 |
| 6,792,110 B2 * | 9/2004 | Sandru ................. 380/51 |
| 6,886,742 B2 * | 5/2005 | Stoutenburg et al. ....... 235/379 |
| 2002/0091991 A1 | 7/2002 | Castro |

FOREIGN PATENT DOCUMENTS

| | | |
|---|---|---|
| EP | 0 962 902 A1 | 8/1999 |
| EP | 1 102 224 A2 | 5/2001 |
| WO | WO 93 024 24 | 2/1993 |
| WO | WO 95/19010 | 7/1995 |
| WO | WO 01/57769 A1 | 8/2001 |

OTHER PUBLICATIONS

Fraud Detection Applications, ImageSoft Technologies, May 31, 2007.

Imagesoft Products—Titan, ImageSoft Technologies, May 31, 2007.

On-line document from Imagesoft Technologies at www.fiserv.com/fiserv_solutions.cfm, printed Mar. 19, 2003.

* cited by examiner

SYSTEM AND METHOD FOR DETECTING CHEQUE FRAUD

This application is a continuation of U.S. patent application Ser. No. 10/309,818 filed on Dec. 5, 2002 now abandoned, which claims the benefit under 35 U.S.C. 119(e) of U.S. Provisional Application No. 60/418,161, filed Oct. 15, 2002.

FIELD OF THE INVENTION

This invention relates to fraud detection systems and more particularly to a system and method for detecting cheque fraud.

BACKGROUND OF THE INVENTION

Cheque fraud is a growing problem for the banking industry and other financial institutions that offer chequing account services. More than 1.2 million worthless cheques enter the North American banking system daily and most of these are fraudulent. Annual losses in North America is estimated to be about $10 billion with banks, corporations and merchants bearing most of the losses. An estimated 60% of cheque fraud constitutes alteration of the payee or the amount of a cheque. Typically, a completed corporate cheque is obtained and readily available technologies are used to alter the payee name or amount of the cheque. An attempt will then be made to cash the fraudulent cheque using stolen or forged identification.

Cheque fraud is particularly troublesome in view of the large volumes of computer generated cheques for stock dividends and payroll cheques generated by automatic cheque preparation systems used extensively throughout North America and Europe. These automated cheque issuance systems make it easier for cheque forgers to alter and process fraudulent cheques since fewer customer cheques are physically handled and reviewed by bank personnel, making it more likely that altered cheques will go undetected. Even when physically inspected, however, many of these falsified items very closely resemble the original cheque drawn on the same customer account that the counterfeit cheque is not detected.

Advanced cheque production systems have been developed which print MICR (MCR) codes onto cheques and special types of cheque papers are used by banks to counteract these widespread fraudulent practices. However, these techniques are readily available to counterfeiters and are incorporated into counterfeiting production. Further, fraudulent individuals and organized groups have access to a variety of means to recreate and duplicate documents. Colour copiers, scanners, desktop publishing programs and laser printers can all be used to manipulate information or create a new document.

Existing fraud detection systems such as those disclosed in U.S. Pat. No. 5,781,654 to Carney are designed to scan and generate a unique identifier code which is then associated with the cheque (e.g. printed on the cheque). At the receiving station (i.e. bank teller), the cheque is again scanned and another code is generated using "complementary" encoding techniques. Finally, the two codes are compared to confirm that the cheque data has not changed since issue. However, the implementation of this kind of fraud detection system usually requires substantial changes to existing cheque processing procedures and facilities and requires bank teller participation.

SUMMARY OF THE INVENTION

The invention provides in one aspect, a fraud detection system for detecting whether information on a cheque has been improperly modified after the original preparation of the cheque, said system comprising:
  (a) an issuance database for storing information associated with a cheque at the time of original preparation of the cheque;
  (b) a scanner for scanning the cheque and generating a digital cheque image;
  (c) a detector module comprising:
    (i) a first optical character recognition engine coupled to the cheque scanner for recognizing characters within the cheque image and for determining whether the recognized characters match the characters associated with the cheque at the time of original preparation;
    (ii) a second optical character recognition engine coupled to the cheque scanner for recognizing characters within the cheque image, said second engine having a higher accuracy than said first engine and being operated according to a first set of presets, and for determining whether the recognized characters match the characters associated with the cheque at the time of original preparation;
    (iii) a third optical character recognition engine coupled to the cheque scanner for recognizing characters within the cheque image and for determining whether the recognized characters match the characters associated with the cheque at the time of original preparation, said third engine being operated according to a second set of presets;
    (iv) a fourth optical character recognition engine coupled to the cheque scanner for recognizing characters within the cheque image, and for determining whether the recognized characters match the characters associated with the cheque at the time of original preparation, said fourth engine being adapted to enhance the resolution of the cheque image prior to reading;
  (d) a verification module for allowing manual verification of the cheque if matching has not occurred within any of said first, second, third and fourth engines;
  (e) a reporting module coupled to the detector module for compiling particulars concerning the matching results.

In another aspect, the present invention provides a method for detecting whether information on a cheque has been improperly modified after the original preparation of the cheque, said method comprising the steps of:
  (a) storing information associated with a cheque at the time of original preparation of the cheque;
  (b) scanning the cheque and generating a digital cheque image;
  (c) detecting whether the information on a cheque matches the information associated with the cheque at the time of original preparation of the cheque by:
    (i) applying a first stage of optical character recognition to the digital cheque image to recognize characters within the image, determining whether the recognized characters match the characters associated with the cheque at the time of original preparation, and if so identifying the cheque as having "passed" and executing step (e);
    (ii) applying a second stage of optical character recognition to the digital cheque image wherein the recognition is more accurate then that of the first stage and where a first set of presets are used to control operation, determining whether the recognized characters match the characters associated with the cheque at the time of original preparation, and if so identifying the cheque as having "passed" and executing step (e);

(iii) applying a third stage of optical character recognition to the digital cheque image wherein a second set of presets are used to control operation, determining whether the recognized characters match the characters associated with the cheque at the time of original preparation, and if so identifying the cheque as having "passed" and executing step (e);

(iv) applying a fourth stage of optical character recognition to the digital cheque image wherein the resolution of the digital cheque image is enhanced, determining whether the recognized characters match the characters associated with the cheque at the time of original preparation, and if so identifying the cheque as having "passed" and executing step (e);

(v) if none of the first, second, third or fourth stages have resulted in a match, then identifying the cheque as having "failed" and executing step (d);

(d) verifying whether the cheque is fraudulent; and (e) compiling a report that includes particulars concerning the results of the detection process in step (c) and the verification process in step (d).

Further aspects and advantages of the invention will appear from the following description taken together with the accompanying drawings.

DETAILED DESCRIPTION OF THE INVENTION

Figure 1:
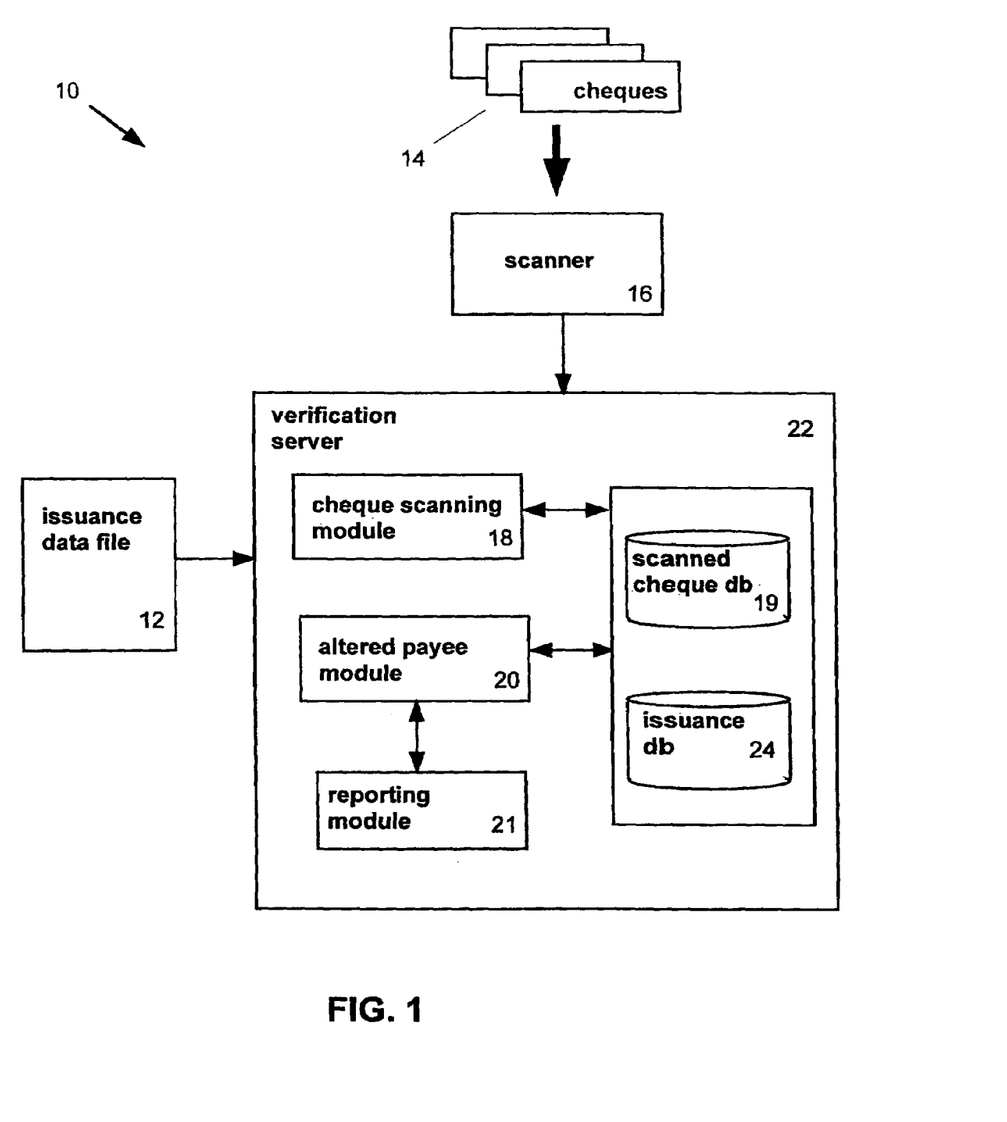
FIG. 1 is a schematic diagram of an example implementation of the cheque fraud detection system of the present invention.

FIG. 1 illustrates the main components of a cheque fraud detection system 10 built in accordance with a preferred embodiment of the invention. Specifically, cheque fraud detection system 10 includes a scanner 16, and a verification server 22 that contains a scanned cheque database 19, an issuance database 24, a cheque scanning module 18, an detection module 20 and a reporting module 21. Cheque fraud detection system 10 iteratively compares the information listed on the faces of a group of cheques 14 with the issue information provided in an issuance data file 12 to determine whether any of the cheques have been fraudulently altered since issue.

Cheques 14 are provided by a client (e.g. a bank, financial institution or large corporation), and are the actual physical cheques 14 that have been pre-cleared by a bank or other institution using their own internal reconciliation process. As will be discussed in detail, cheque fraud detection system 10 is designed to conduct a rigorous comparison between the information that is physically provided on the face each cheque 14 and what was originally printed on the cheque at time of issue (i.e. as stored in the issuance data file 12).

Figure 2:
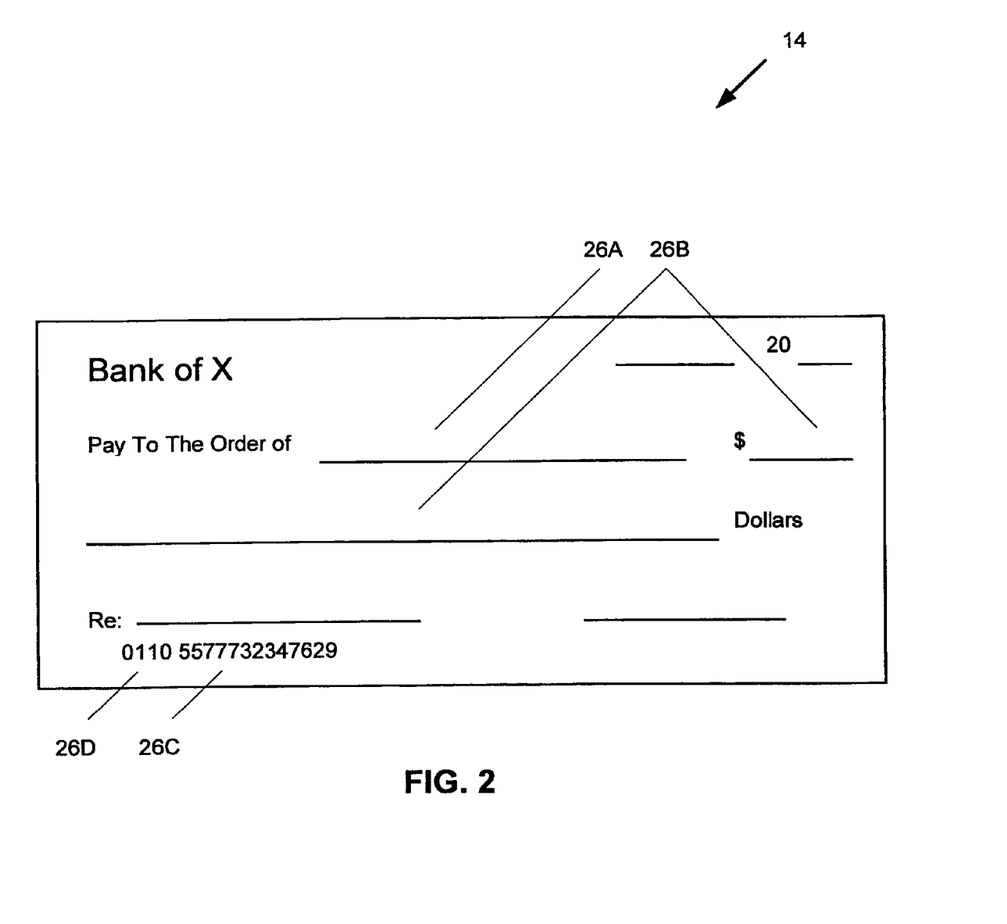
FIG. 2 is a diagram of a typical cheque that is processed by the cheque fraud detection system of FIG. 1.

FIG. 2 illustrates the kinds of information featured on the front of a conventional cheque 14. Cheque fraud detection system 10 is mainly concerned with various fields, namely the Payee Field 26A, the Amount Field 26B and Magnetic Ink Character Recognition (MICR) Data 26C. MICR Data 26C can be found on the bottom line of all cheques 14 that are printed and used in North America and is an encoding used by banks to read the key pieces of information associated with a cheque in an automated fashion. MICR Data 26C allows for the automatic processing of a large number of cheques 26 by machine. MICR data 26C generally encodes three or four items, and generally the three items that cheque fraud detection system 10 is concerned with, namely the serial number, the account number and the amount.

While the operation of cheque fraud detection system 10 is being described in relation to the type of cheque 14 shown in FIG. 2, it should be understood that cheque fraud detection system 10 can be adapted to scrutinize various types of cheques with various information fields.

Referring back to FIG. 1, scanner 16 is used to scan and create digital images of each cheque 14. Scanner 16 is preferably a BUIC 1500 Back Office Check Scanner (manufactured by Digital Check Corporation of Illinois) although it should be understood that other scanners can be utilized and that the process is not limited to using this kind of scanner. Scanner 16 creates digital images that are stored within a scanned cheque database 19. While scanner 16 is illustrated as being physically part of the cheque fraud detection system 10, it should be understood that alternatively, it would be possible for digital image data to be generated off-site (i.e. at a client's site) and communicated remotely to verification server 22.

Cheque scanning module 18 is coupled to scanner 16 and is used to process and organize the digital images generated by scanner 16 for each cheque 14 that has been scanned. The specific operation of cheque scanning module 18 will be described in further detail below. It should be understood that other commercially available software could be used for this purpose.

Scanned cheque database 19 of verification server 22 stores digital images of scanned cheques that are received from scanner 16 as processed by cheque scanning module 18. Scanned cheque database 19 is custom built using Visual Basic code with reference to Microsoft DAO 2.5/3.51 Compatability Library which in turn stores the data in a MS Access 97 database.

Issuance data file 12 is a data file supplied by a client (e.g. a bank, financial institution or large corporation) that contains a detailed data description of the information associated with cheques 14 issued by the client within a particular time frame. Issuance database file 12 contains the serial number (from Serial No. Field 26D), payee name (from Payee Field 26A), date and amount of cheque (from Amount Field 26B) for each cheque 14. The accurate record of all cheques 26 as issued by a corporation stored within issuance database file 12 is critical to the proper operation of cheque fraud detection system 10. Issuance database file 12 allows cheque fraud detection system 10 to compare what is physically written on a cheque 14 with what was printed on a cheque 14 at the time of issue.

Issuance database 24 of verification server 22 stores the information received from issuance data file 12. Specifically, issuance database contains cheque number, account number, paid date, payee name and amount. An image name field is added for retrieval purposes and is populated with data during the operation of detection module 20, as will be described. Issuance data file 12 can be sent from a client to cheque fraud detection system 10 through various mediums (e-mail, FTP, floppy disk, or CD-ROM) and in various formats (ASCII, text, Microsoft Excel, Microsoft Access). When issuance data file 12 is received by cheque fraud detection system 10, it is converted from text file format into a mdb format by Microsoft Access (manufactured by Microsoft of Seattle) which is then recorded and stored (in a mdb format) on issuance database 24. While this type of database format is preferred, it is not necessary that issuance database 24 be implemented using a Microsoft Access database and it should be understood that other databases suitable for this purpose could be used instead.

Detection module 20 determines whether physical alterations have been made to any of the cheques 14 by comparing the digital images of cheques 14 (as generated by cheque scanning module 18) to the images of cheques 14 as they were at issue as contained in issuance database 24. Each item of the issuance data file 12 is compared against the honored cheque 14 to ensure there have been no alterations. Detection module 20 carries out this comparison process in due time to allow the issuing bank, or the issuer to charge back the value in accordance with the local banking regulations of the business. The specific operation of detection module 20 will be described in further detail below.

Reporting module 21 provides reporting functionality for cheque fraud detection system 10. Specifically, reporting module 21 receives information from detection module 20 and issuance database 24 and generates client reports. The generated reports can be in various formats (e.g. ASCII, pdf, etc.) and delivered to client in various ways. Reporting module 21 is implemented using PDFLib (manufactured by PDF GmbH of Germany) which creates PDF documents from the tiff formatted fraud detection results (as stored in detection database 48). The content of the PDF includes a snapshot of the cheque in question, the company and contact information of the client and detailed information on the fraud detection results themselves. Since PDFLib does not require any third party software, PDFLib can generate PDF data directly in memory resulting in better performance and avoiding the need for temporary files. The PDF client report can then be faxed or e-mailed to the client. Client reporting information is preferably cataloged using the customer account number so that client information can be stored in a separate file and extracted as needed by the customer account number.

Again, it should be understood that cheque fraud detection system 10 could be implemented using various commercially available scanning, database, and programming software products.

Figure 3:
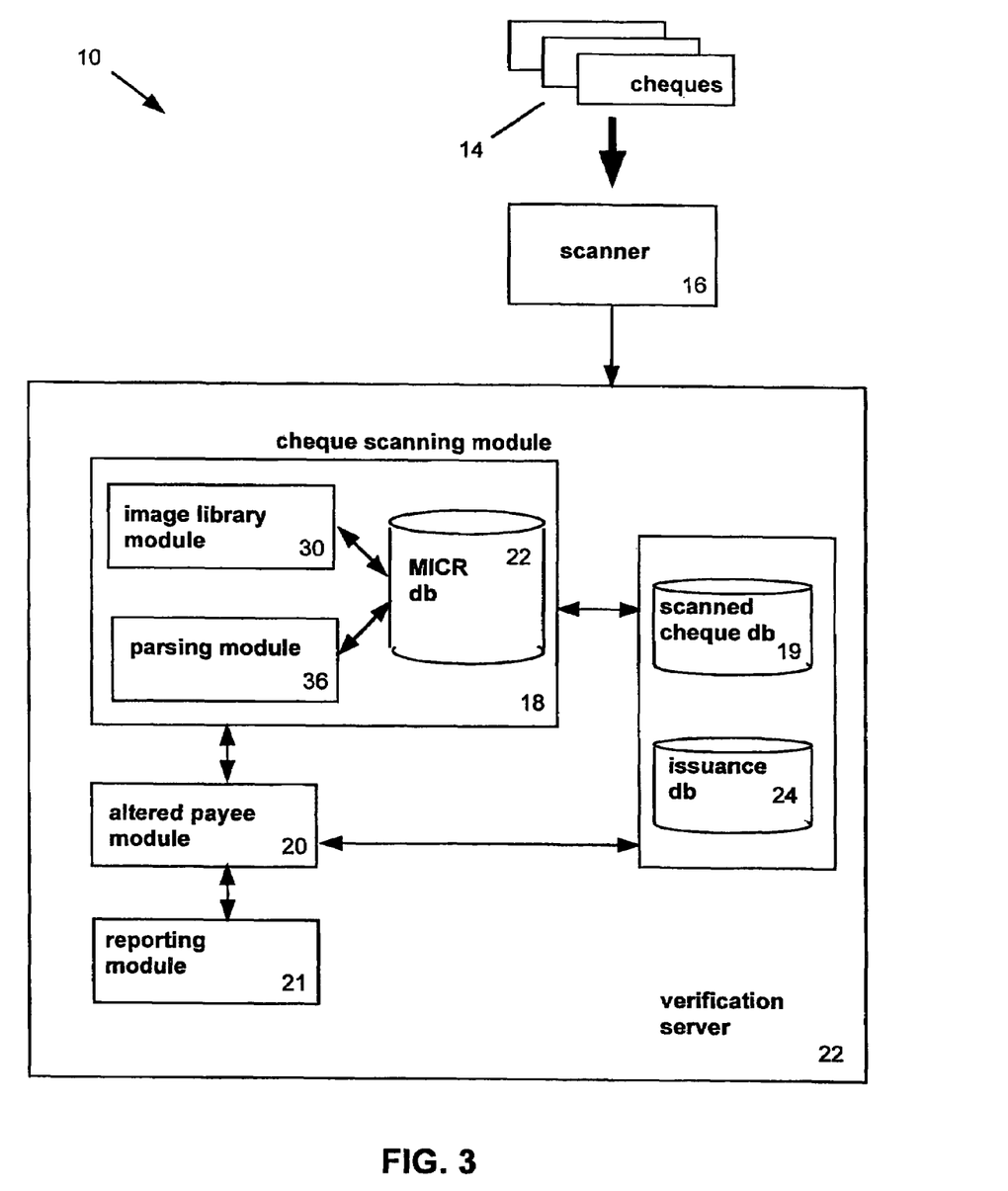
FIG. 3 is a schematic diagram illustrating the cheque scanning module of FIG. 1 in more detail.

FIG. 3 is a schematic diagram that illustrates the elements and operation of cheque scanning module 18 in more detail. Cheque scanning module 18 includes an image library module 30, a parsing module 36 and a MICR database 22. Cheque scanning module 18 receives digital image input from scanner 16, processes the image data, and builds records in issuance database 24. The information stored in issuance database 24 will then be utilized by detection module 20 and reporting module 21, as will be described further.

As cheques 14 are fed into scanner 16 three images of each cheque 14 are created. First, an image of the front of the cheque 14, an image of the back of the cheque 14, and the MICR data 26C of the cheque 14. The specific scanner utilized (the BUIC 1500 as described above) has built in functionality which allows it to create an image of the MICR data 26C. The MICR data 26C of each cheque 14 that has been read by scanner 16 is written and stored in MICR database 32. MICR database 32 is preferably a MS Access database, however it can be implemented by employing other available databases (e.g. Sybase, Oracle, etc.) Each record in MICR database 32 contains the MICR data 26C that has been extracted from each cheque 14. The MICR database 32 contains pointers to the front and back images of the cheque 14, which are themselves stored in scanned cheque database 19 from which the MICR data 26C is taken.

Image library module 30 is preferably implemented using the Unisoft toolkit (manufactured by UniSoft Imaging of Oklahoma) which processes tiff input into multipate tiff output and is conventionally used to integrate document imaging into other applications. The MICR E13B font used in North America is returned from scanner 16, is interpreted by image library module 30 and stored in MICR database 22. Image library module 30 joins the separate images of the front and back of cheque 14 (that are created for each cheque 14 after scanning and stored in scanned cheque database 19) into one image. The composite joined image of the front and back of the cheque 14 is then stored in scanned cheque database 19.

Once all of cheques 14 have been scanned, and the appropriate records have been created in MICR database 22 and scanned cheque database 19, parsing module 36 is used to parse the various components of MICR data 26C. The parsing process reads, record by record, the MICR line into memory. As previously mentioned, MICR data 26C contains several key elements, namely the serial or cheque number, the routing/transit number, the account number and the amount. As each cheque 14 is scanned, parsing module 36 reads the MICR database 22 and parses the components of MICR data 26C, breaking it up into its constituent parts.

The operation of parsing module 36 will be illustrated with regards to the following example of MICR data 26C:

E<04796508<:09612=004:=5614<;0002478993

Parsing module 36 works from left to right, and starts by stripping non-numeric characters so that the serial number 26D of a cheque 14 can be extracted. Specifically, each character is read until the first non-numeric character is encountered. In this example, the serial number 26D will be "04796508", which will be stored in a temporary variable, as the rest of the MICR data 26C is parsed. Parsing module 36 is now left to operate on:

<:09612=004:=5614<;0002478993

Cheque fraud detection system 10 does not make use of the routing transit number which forms the next two set of numbers. Accordingly, parsing module 36 locates the account number by searching for the numerical data that follows the combination of characters designated by ":=". The account number in this example would be "5614". The parsed remaining portion of the MICR data 26C is representative of the amount.

<;0002478993

Once the MICR record for one cheque 14 from MICR database 22 has been parsed and the serial number 26D has been determined, issuance database 24 records are searched for this serial number 26D. Once the serial number 26D is located in issuance database 24, the associated image data is assigned to (i.e. an appropriate pointer created) the cheque record in issuance database 24. Once all the records in MICR database 22 have been parsed, and the respective serial numbers 26D searched in issuance database 24, each record in issuance database 24 will have a pointer to the location of the image of the front and back of the cheque 14 as stored in scanned image database 19.

Cheque fraud detection system 10 is also designed to compensate for errors that may be returned when scanning cheques 14. There are two categories of errors that may arise during the course of cheque processing, namely 'feed errors' and 'data errors'. Feed errors, are generally errors such as a partial image being read, or poor image contrast, which can generally be corrected at the point of scanning, or in post production quality control. The data errors are corrected using two processes associated with the detection module 20 as will be described in detail. First, recognition engine 40 (FIG. 4) corrects any MICR misreads by matching the captured data against the supplied data (i.e. inaccurate reads are represented by '@@@' symbols). Then recognition engine 40 will read the MICR line and perform the OCR function on the lines of data which include the '@@@' symbols. If this results in a more accurate read then the cheque may be passed (as will be discussed in detail). What '@' symbols that remain can be viewed manually and edited by quality control personnel in real-time.

After parsing module 36 has parsed all the MICR data 26C, there may be records in the MICR database 22 which do not have a serial number 26D that corresponds to any serial numbers contained in the records of issuance database 24. Each serial number 26D that is extracted from MICR data 26C but that cannot be found in issuance database 24, will be manually entered into issuance database 24. As will be described, cheque fraud detection system 10 provides clients with notification that there was no record in issuance database 24 for the cheques requiring manual entry and accordingly that these cheques have not undergone fraud detection. It may also be possible that while there is a record in issuance database 24 for a particular cheque 16, there is no corresponding physical cheque 14. If this is the case, issuance database 24 will retain these records until the corresponding physical cheque 14 is submitted to cheque fraud detection system 10.

Figure 4:
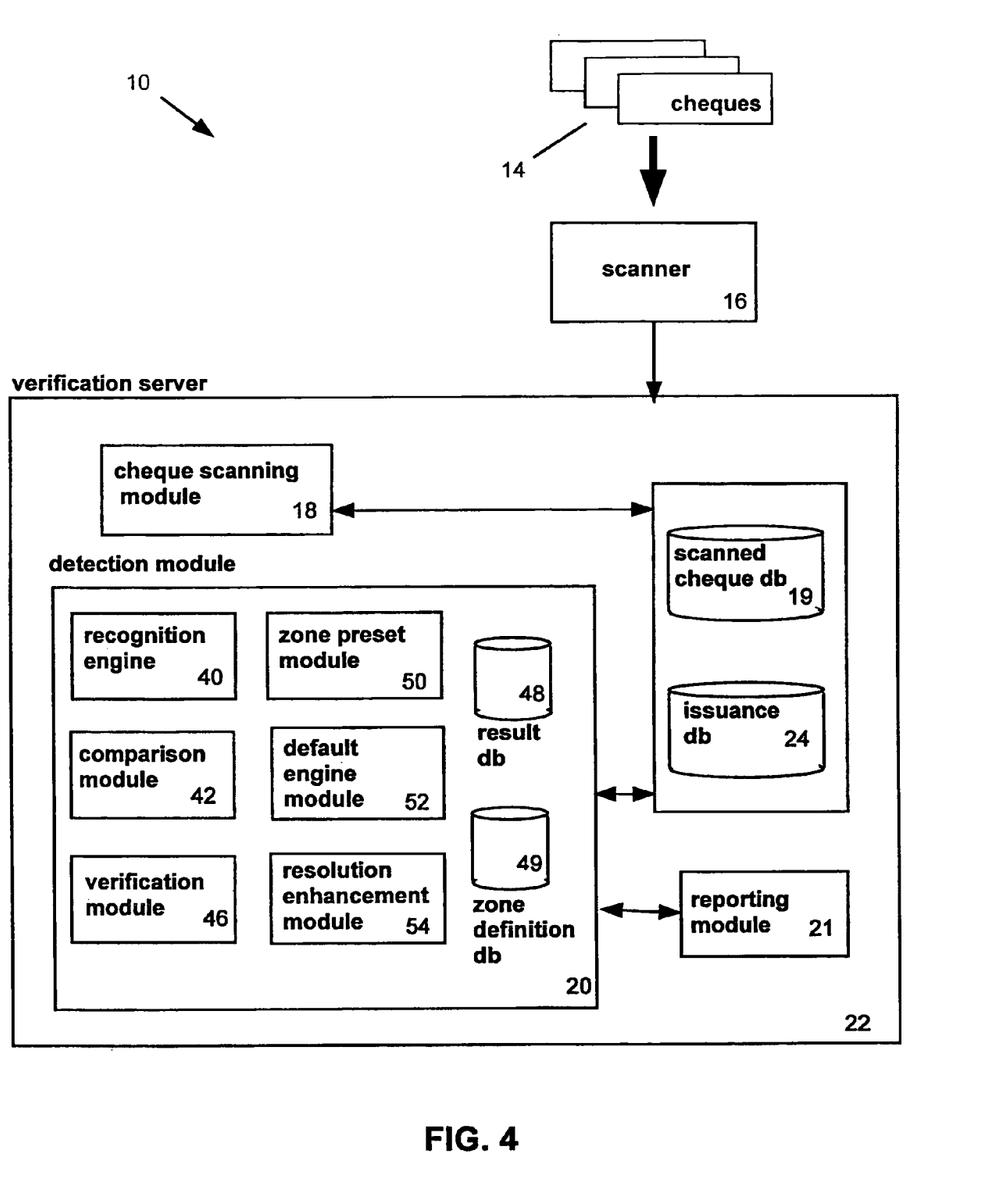
FIG. 4 is a schematic diagram illustrating the altered payee module of FIG. 1 in more detail.

FIG. 4 is a schematic diagram that illustrates the functional elements and operation of detection module 20 in more detail. Detection module 20 includes a recognition engine 40, a comparison module 42, a zone preset module 50, a default engine module 52, a resolution enhancement module 54, a verification module 46, and a result database 48. Detection module 20 retrieves the digital images generated by cheque scanning software module 18 from scanned cheque database 19 and reads and compares three different types of cheque information, namely payee information, serial number, and cheque amount. Detection module 20 compares the scanned information with the corresponding information recorded in issuance database 24 in order to detect potentially fraudulent attempts to alter the information originally printed on cheque 14. If potentially fraudulent attempts to alter information printed on cheque 14 are detected, then detection module 20 instructs reporting module 21 to prepare a report in written and/or electronic form to advise the client accordingly.

Recognition engine 40 is used to read key information from the digital cheque images that are generated by cheque scanning module 18 and stored in scanned cheque database 19. As noted above, issuance database 24 contains key information about the cheques 14 that has been received from the client (i.e. key information as printed on the face of cheque 14 at time of issue). For each cheque record in issuance database 24, a pointer is maintained that points to the corresponding scanned cheque image generated by cheque scanning module 18 and stored in scanned cheque database 19. Recognition engine 40 uses optical character recognition techniques to read digital images of cheques 14 to determine payee 26A, serial number 26D and amount 26B information.

Recognition engine 40 is preferably implemented using Nestor Reader (manufactured by NCS Pearson of Minnesota) which is a toolkit that processes tiff image input and converts to a text output. However, it should be understood that any other suitable OCR software could be utilized. Recognition engine 40 uses imaging templates in order to efficiently read certain "zones" on cheque 14. Zone characteristics and constraints can be defined and saved to a file (.zdf) within zone definition database 49. Examples of zone characteristics are character spacing, upper or lower case, multi-lined, etc. .zdf files are stored in an ASCII text format and are easily modified for new clients and their particular cheque layout. Accordingly, recognition engine 40 receives the image of cheque 14 as stored in scanned cheque database 19 and uses information from zone definition database 49 to enable for targeting of certain areas of the image of a cheque 14.

Recognition engine 40 also uses Kofax ImageControls (manufactured by Kofax Image Products of California) to create imaging templates on cheque 14. The Kofax ImageControls product is a toolkit that processes image files (in this case TiffGroup4 files). Multiple zones are created and configured to allow for the capture of data within certain key fields on the physical cheque. Zone information for each field is stored in a zone definition file (.zdf), which is unique for each individual cheque type (or Customer Account Number) that can vary from client to client. Different clients will have different zone definition files (.zdf) that correspond to the specific characteristics of their respective cheques 14.

This approach allows for the creation and utilization of individual zones that circumscribe the areas that require OCR translation (i.e. small, tight areas can be defined). These targeted recognition zones allow for a higher degree of accuracy as the software interprets the digitized image without the need to recognize and/or process superfluous data (e.g. extraneous markings etc.) The Kofax Adrenaline accelerator product is preferably used to improve the quality of images and information capture by performing sophisticated image cleanup, image enhancement and recognition at the time of scanning. This speeds up the overall recognition process and enhances the other capture processes within detection module 20. Recognition engine 40 operates in batch mode such that each database record from issuance database 24 is read and each image is retrieved from scanned cheque database 19 and processed. The scanned and recognized cheque information is then stored in result database 48.

Comparison module 42 compares optically recognized information (e.g. payee, serial number, amount) from each scanned physical cheque 14 as stored in result database 48, with the information (e.g. payee, serial number, amount) stored in issuance database 24. If the comparison module 42 does not find a match between the optically recognized information and the stored issuance information (i.e. comparison "fails"), then resolution enhancement module 44 is used to enhance the scanning resolution of the recognition engine 40. If the information is compared and matched (i.e. comparison "passes"), then detection module 20 continues with the batch run. At the end of the batch run, detection module 20 instructs reporting module 21 to prepare an appropriate report and provides pass/fail information to reporting module 21 for this purpose. Information regarding pass/fail status and what the recognition process actually read and processed is available for review by quality control personnel. This allows for manual review of potential recognition errors and in such an instance, the operator can modify the misread character.

Comparison module 42 determines whether the optically recognized information and the stored issuance information matches according to a predetermined set of pass/fail criteria. The pass/fail criteria is based on the percentage of character matching and is variable depending on client requirements. The percentage of character matching required differs depending on the information to be matched. For example, payee information can be required to achieve matching of over 81% or more. Under such a condition, all cheques that are matched under 81% are forwarded to quality control personnel for visual inspection. Since it is important to have to match the serial or cheque number of a cheque, the associated pass/fail criteria is 100%. Any serial/cheque number match that falls below the 100% level is forwarded to quality control personnel for visual inspection. Finally, the cheque amount pass/fail criterion is based on the amount and a plus/minus (i.e. tolerance) band (e.g. $10 difference).

Comparison module 42 uses a custom algorithm to compare OCR reads cheque information to the issuance database 24. For example, the payee name (as supplied by the client—25 characters maximum) is broken down word by word using detected spaces. Then each whole word is compared to exact strings obtained from the first 25 characters as read by recognition engine 40 keeping in mind the relative position (i.e. words found at the start of a string are only matched with words also found at the start of a string). If a whole word or string is found within the characters read by recognition engine 40, then the number of characters are kept track of by a program counter. Any words that are recognized are stripped out of the recognized string. All remaining characters in the recognized string are read from left to right and compared to characters in the client-supplied payee name in a relative position. Matched single characters are also kept track of by the program counter. The percentage of characters matched are based on two conditions. First, if the length of the recognized string is greater than the actual number of characters (including spaces) in the client-supplied payee name then the percent value will be:

$$percentvalue = \frac{countervalue}{\frac{actualstringlength - recognizedlength}{2} - \#ofspaces}$$

Otherwise, the percent value will be:

$$percentvalue = \frac{numberofcharactersmatched}{actualstringlength - \#ofspaces}$$

The following is the pseudo-code representation of the above relations:

```
Psuedo Code (VB)
        If lngLengthOfNestorRead > lngLengthOfPayee Then
            dblPercent = lngMatch / (((lngLengthOfPayee +
lngLengthOfNestorRead) / 2) - lngSpaceCount)
        Else
            dblPercent = lngMatch / (lngLengthOfPayee -
            lngSpaceCount)
        End If
        dblPercent = dblPercent * 100
    If the LenOfOCR_Results is greater than LenOfIssuanceString...
    Percent = PointsSystemNumber divided by ((LenOfIssuanceString
plus LenOfOCR_Results) divided by 2) subtract the number of spaces
found
    Otherwise...
    Percent = lngMatch divided by (LenOfIssuanceString subtract
number of spaces)
    Multiple Percent by 100
If the percent is 80 or under, the cheque has failed.
```

Detection module 20 employs a multi-tiered approach in attempting to determine what is contained on a cheque 14 for it to be compared with what is contained in issuance database 24 (e.g. payee information, serial number and amount). It will first be attempted to employ faster techniques in order to be able to determine what is written on a cheque 14, failing this slower but more accurate methods will be employed. Specifically, detection module 20 includes zone preset module 50, default engine module 52 and resolution enhancement module 44. These modules are utilized to read the digital cheque image if comparison module 42 considers the match produced by recognition engine 40 to be inadequate (i.e. the comparison "fails"). These three extra detection modules are implemented by using cooperating expert subsystems that contribute to the analysis and recognition of characters and words, as well as the underlying page. These three detection modules apply OCR technology at a slower rate which results in improved recognition on a wide variety of documents with complex layouts.

Zone preset module 50 is used to extract the information that is written on a cheque 14 by using a zone definition file (.zdf) as discussed above in relation to recognition engine 40. Zone present module 50 is preferably implemented by ScanSoft OCR as discussed above, which similar in function to Reader OCR Engine. The Scansoft engine uses settings which are stored in a .ini file that contains specifications that are specific for each client and its particular cheques 14 (e.g. digits, uppercase, lowercase, punctuation, etc.) Scansoft OCR uses the zone definition file (.zdf) employed by Nestor-Reader OCR engine in order to determine the zones that need to be focused on for a cheque 14. The client .pdf profile contains preset values relating to which commercial OCR engine is used and which OCR constraints are in effect as determined during initial setup of the clients' test cheques. Each client profile contains specifications that are particular to its cheque format. The data obtained from zone preset module 50 is sent to comparison module 42 and if the comparison "fails" then default engine module 52 is enabled.

Default engine module 52 applies the default or factory-set OCR constraints. The inventors have determined through experimentation that after running cheques 14 through zone preset module 50 using carefully selected preset zone values, approximately 8 out of 10 cheques would be identified. By running the remaining two cheques through the Scansoft system again without using the preset values of zone present module 50, and then by passing them through resolution enhancement module 54, it would found that most of the time the other two cheques could be read and processed. Since not all cheques are issued on the same stock or font, default engine module 52 may not produce 100% accuracy and accordingly, the other engines are used as discussed. The data obtained from default engine module 52 is sent to comparison module 42 and if the comparison "fails" then resolution enhancement module 54 is enabled.

Resolution enhancement module 54 utilizes slower rate optical character recognition detection to provide more accurate readings of lower quality text. Resolution enhancement module 44 is preferably implemented by Scansoft OCR software (manufactured by ScanSoft Inc. of Massachusetts) which is a toolkit that processes tiff image input and converts it to a text output using a high resolution engine. However, it should be understood that any other high resolution optical character recognition software could be utilized. Resolution enhancement module 44 utilizes the Scansoft OCR Developer's Toolkit 2000 to double the pixel resolution of the cheque image from 200 DPR to 400 DPI.

Figure 6A:
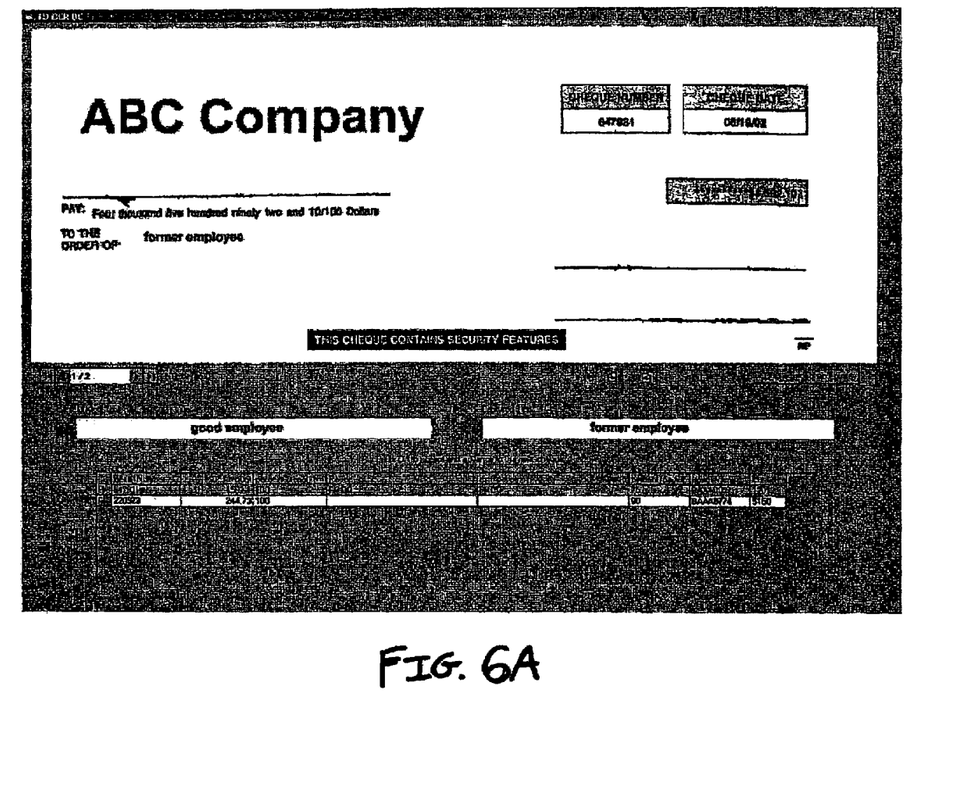
FIGS. 6A and 6B are sample screen captures illustrating the verification procedures that are provided by the verification module of FIG. 4.
Figure 6B:
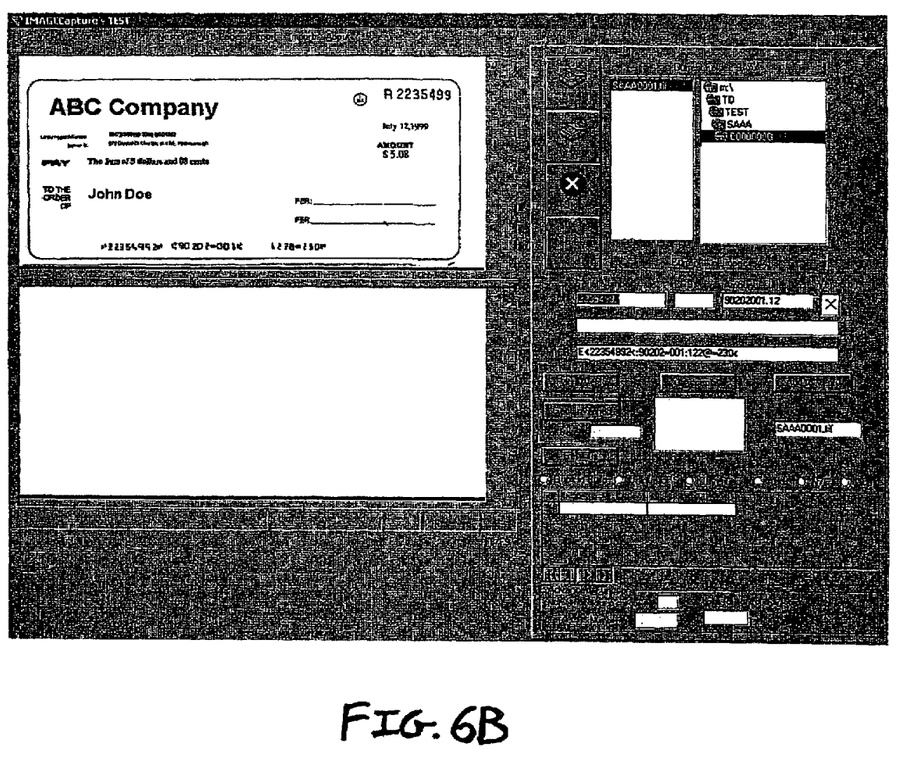

Verification module 46 provides quality control personnel with automated assistance for the verification part of the detection process. After recognition engine 40, zone preset module 50, default engine module 52 and resolution enhancement module 54 have processed all of the cheques 14, quality control personnel review failed cheques using a split-screen interface (not shown). The split-screen interface (see FIG. 6B) displays the detection (i.e. matching) results (i.e. from result database 48) along with the associated scanned cheque (i.e. from scanned cheque database 19). Each failed cheque is flagged with a marker in the data table in result database 48 (e.g. a red X). Until this marking is replaced with a pass (i.e. a red V) the cheque cannot be exported. Quality control personnel edits or overrides a previously failed read. Once the edited data matches the extracted data, the flag is switched and the program advances to the next failed cheque. If cheque data (i.e. from issuance database 24) is still not reconciled to the processed and paid cheque, then a PDF report is generated through reporting module 21 and delivered to the client as described above.

Figure 5:
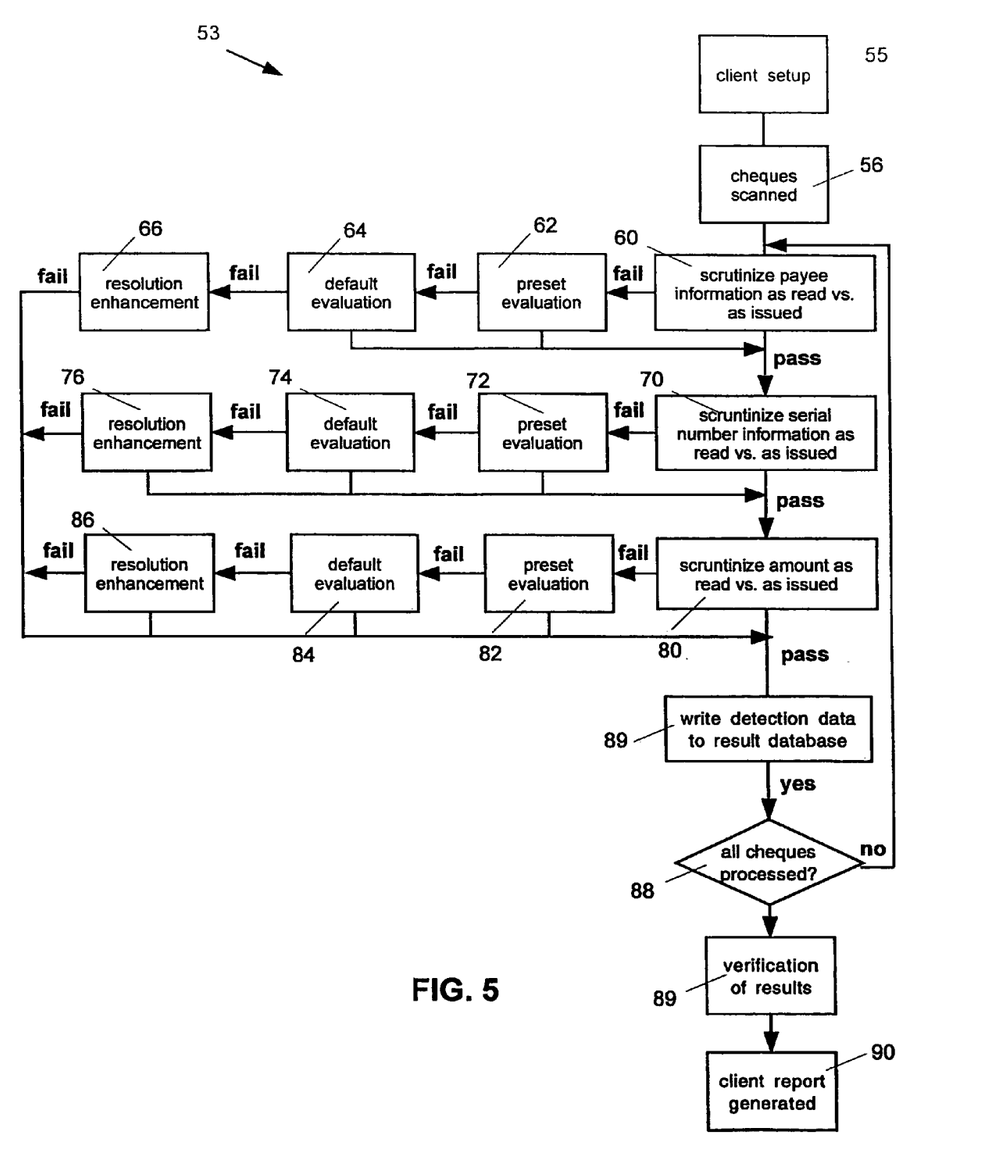
FIG. 5 is a flowchart illustrating the main steps utilized by the cheque fraud detection system of FIG. 1.

Referring now to FIG. 5, the flowchart illustrated there describes the basic process steps of cheque fraud detection system 10 which have been detailed above.

At step (55), cheque fraud detection system 10 processes a new client and creates a client profile based on a client-submitted template-based profile (preferably in MS word). The profile includes information on This step includes client administrative information (e.g. name, address, phone, fax) and procedural (e.g. number of accounts and volume of cheques). This profile information is entered into issuance database 24 along with other important information such as server path, directories, last image or tiff name scanned and last CD-ROM authored. As discussed above, issuance database 24 is accessed by both cheque scanning module 18 and detection module 20. Directory space is created and several cheques are scanned to determine character density. Zone information and presets are tested at this step as well.

At step (56), cheques 14 are scanned by scanner 16 and image library module 30 of cheque scanning module 18 stores front and back cheque images of cheque 14 in scanned cheque database 19 and creates corresponding MICR data records in MICR database 22. At step (57), parsing module 36 of cheque scanning module 18 parses the MICR records to obtain the serial/cheque and account numbers.

At step (58), recognition engine 40 is used to read payee, serial number and amount information from a scanned cheque 14 (as stored in scanned cheque database 19). At step (60), comparison module 42 compares the optically recognized payee information from recognition engine 40 with that retrieved from issuance database 24. If this comparison is successful then at step (70), comparison module 42 compares the optically recognized serial number information from recognition engine 40 with that retrieved from issuance database 24. If this comparison is successful then at step (80), comparison module 42 compares the optically recognized cheque amount information from recognition engine 40 with that retrieved from issuance database 24. If this comparison is successful then at step (87), the system writes all of the detection process related results and details to result database 48. At step (88), detection module 20 determines whether there are additional cheques 14 to process. If so, then step (60) is re-executed.

If not, then at step (89), verification module 46 reads information from result database 48 and provides quality control personnel with information relating to "failed" cheques. At step (90), reporting module 21 is used to generate the client report.

If, at step (60), the recognition engine 40 is not successful at obtaining a "passed" match for the payee information of a cheque 14 (as determined by comparison module 42) then at step (62), the zone preset module 50 is used to further scrutinize the scanned cheque image. If this produces a "pass" then step (70) is entered. If not, then default engine module 52 is used to further scrutinize the scanned cheque image. If this produces a "pass" then step (70) is entered. If not, then resolution enhancement module 52 is used to further scrutinize the scanned cheque image. If this produces a "pass" then step (70) is entered. If a "fail" is enter, then step (87) is entered where it is determined whether any other cheques 14 need to be processed.

If, at step (70), the recognition engine 40 is not successful at obtaining a "passed" match for the serial number information of a cheque 14 (as determined by comparison module 42) then at step (72), the zone preset module 50 is used to further scrutinize the scanned cheque image. If this produces a "pass" then step (80) is entered. If not, then default engine module 52 is used to further scrutinize the scanned cheque image. If this produces a "pass" then step (80) is entered. If not, then resolution enhancement module 52 is used to further scrutinize the scanned cheque image. If this produces a "pass" then step (80) is entered. If a "fail" is enter, then step (87) is entered where it is determined whether any other cheques 14 need to be processed.

If, at step (80), the recognition engine 40 is not successful at obtaining a "passed" match for the payee information of a cheque 14 (as determined by comparison module 42) then at step (82), the zone preset module 50 is used to further scrutinize the scanned cheque image. If this produces a "pass" then step (87) is entered. If not, then default engine module 52 is used to further scrutinize the scanned cheque image. If this produces a "pass" then step (87) is entered. If not, then resolution enhancement module 52 is used to further scrutinize the scanned cheque image. If this produces a "pass" then step (87) is entered.

Cheque fraud detection system 10 allows for the improved detection of whether information on a cheque has been improperly modified after the original preparation of the cheque. By applying a series of slower more precise OCR processes, cheque fraud detection system 10 can provide additional automated scrutiny in the case where information on the face of a cheque is unreadable or there is no match with the information in the issuance database. Any cheques that are not successfully read and matched through these additional recognition processes are highlighted as an "exception" and immediately forwarded to the client for further action. Further, since there is no need to incorporate new equipment or to change existing system equipment and since cheque fraud detection system 10 can be run from a single personal computer, cheque fraud detection system 10 can be easily and very quickly implemented into existing cheque reconciliation and processing systems.

As will be apparent to those skilled in the art, various modifications and adaptations of the structure described above are possible without departing from the present invention, the scope of which is defined in the appended claims.

The invention claimed is:

1. A fraud detection system for detecting whether information on a cheque has been improperly modified after an original preparation of the cheque, where the cheque is associated with a cheque type having pre-defined zones, said system comprising:
    (a) an issuance database for storing information associated with a cheque at the time of the original preparation of the cheque;
    (b) a scanned cheque database for storing a scanned cheque image of the cheque;
    (c) a detector module comprising:
        (i) a first optical character recognition engine coupled to the scanned cheque database for recognizing characters within the scanned cheque image and for determining whether the recognized characters match the characters associated with the cheque at the time of original preparation;
        (ii) a second optical character recognition engine coupled to the scanned cheque database for recognizing characters within the scanned cheque image, said second engine programmed to perform recognition at a slower rate than the first engine for determining whether the recognized characters match the characters associated with the cheque at the time of original preparation;
        (iii) a third optical character recognition engine coupled to the scanned cheque database for recognizing characters within the scanned cheque image and for determining whether the recognized characters match the characters associated with the cheque at the time of original preparation, said third engine being operated according to a set of default character recognition settings;
        (iv) a fourth optical character recognition engine coupled to the scanned cheque database for recognizing characters within the scanned cheque image, and for determining whether the recognized characters match the characters associated with the cheque at the time of original preparation, said fourth engine being programmed to enhance the resolution of the scanned cheque image prior to reading;
        said detector module directing the character recognition being conducted by at least one of the first, second, third and fourth engines to the pre-determined zones associated with the cheque type of the cheque;
    (d) a verification module for allowing manual verification of the scanned cheque image if none of said first, second, third and fourth engines has determined that the recognized characters match the characters associated with the cheque at the time of original preparation; and
    (e) a reporting module coupled to the detector module for compiling particulars concerning the matching results.

2. The fraud detection system of claim 1, wherein the information is the cheque payee.

3. The fraud detection system of claim 1, wherein the information is the cheque serial number.

4. The fraud detection system of claim 1, wherein the information is the cheque amount.

5. The fraud detection system of claim 2, wherein the determining of matches in (c) is based on a predetermined percentage of character matching.

6. The fraud detection system of claim 4, wherein the determining of matches in (c) is based on a character matching tolerance that corresponds to a predetermined dollar value.

7. A method for detecting whether information on a cheque has been improperly modified after an original preparation of the cheque, where the cheque is associated with a cheque type having pre-defined zones, said method comprising:
    (a) storing information associated with a cheque at the time of original preparation of the cheque;
    (b) storing a scanned cheque image for the cheque;
    (c) detecting whether the information on a cheque matches the information associated with the cheque at the time of original preparation of the cheque by:
        (i) applying a first stage of optical character recognition to the scanned cheque image to recognize characters within the scanned cheque image, determining whether the recognized characters match the characters associated with the cheque at the time of original preparation, and if so identifying the cheque as having "passed" and executing step (e);
        (ii) applying a second stage of optical character recognition to the scanned cheque image wherein the recognition is performed at a slower rate than during the first stage, determining whether the recognized characters match the characters associated with the cheque at the time of original preparation, and if so identifying the cheque as having "passed" and executing step (e);
        (iii) applying a third stage of optical character recognition to the scanned cheque image according to a set of default character recognition settings are used to control operation, determining whether the recognized characters match the characters associated with the cheque at the time of original preparation, and if so identifying the cheque as having "passed" and executing step (e);
        (iv) applying a fourth stage of optical character recognition to the scanned cheque image wherein the resolution of the scanned cheque image is enhanced, determining whether the recognized characters match the characters associated with the cheque at the time of original preparation, and if so identifying the cheque as having "passed" and executing step (e);
        where the character recognition being conducted by at least one of the first, second, third and fourth stages is directed to the pre-determined zones associated with the cheque type of the cheque;
        (v) if none of the first, second, third or fourth stages have resulted in a match, then identifying the cheque as having "failed" and executing step (d);

(d) verifying whether the cheque is fraudulent; and (e) compiling a report that includes particulars concerning the results of the detection process in step (c) and the verification process in step (d).

8. The method of claim 7, wherein the information is the cheque payee.

9. The method of claim 8, wherein the determining of matches in (c) is based on a predetermined percentage of character matching.

10. The method of claim 7, wherein the information is the cheque serial number.

11. The method of claim 7, wherein the information is the cheque amount.

12. The method of claim 11, wherein the determining of matches in (c) is based on a character matching tolerance that corresponds to a predetermined dollar value.

* * * * *